United States Patent
Scheim et al.

(10) Patent No.: US 10,135,529 B2
(45) Date of Patent: Nov. 20, 2018

(54) AUTOMOTIVE LIGHT BASED COMMUNICATION SYSTEM FOR USER EQUIPMENT

(71) Applicant: GM GLOBAL TECHNOLOGY OPERATIONS LLC, Detroit, MI (US)

(72) Inventors: Kobi J. Scheim, Pardess Hanna (IL); Yohay Buchbut, Pardess Hanna (IL); Nadav Levkovich, Givatayim (IL); Eilon Riess, Zikron-Yaakov (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/406,958

(22) Filed: Jan. 16, 2017

(65) Prior Publication Data
US 2018/0205457 A1    Jul. 19, 2018

(51) Int. Cl.
*H04B 10/40* (2013.01)
*H04B 10/116* (2013.01)
*H04M 1/737* (2006.01)

(52) U.S. Cl.
CPC .......... *H04B 10/116* (2013.01); *H04B 10/40* (2013.01); *H04M 1/737* (2013.01)

(58) Field of Classification Search
CPC .... H04B 10/116; H04B 10/1143; H04B 10/40
See application file for complete search history.

(56) References Cited

U.S. PATENT DOCUMENTS

| | | | | |
|---|---|---|---|---|
| 2015/0372753 A1* | 12/2015 | Jovicic | ................. | H04B 10/116 398/172 |
| 2016/0065306 A1* | 3/2016 | Huang | ................. | H04B 10/116 398/118 |
| 2017/0230790 A1* | 8/2017 | Skomra | ................. | H04W 4/021 |
| 2017/0331552 A1* | 11/2017 | Castor | ................ | H04B 10/1143 |

* cited by examiner

*Primary Examiner* — Dzung Tran
(74) *Attorney, Agent, or Firm* — Cantor Colburn LLP (57) ABSTRACT

A vehicle and a method of communication for a vehicle is disclosed. The vehicle includes an on-board gateway for communication using visible light communication (VLC) and a visible light transceiver that is operated by the on-board gateway to enable VLC data communication. The transceiver can communicate with a VLC-enabled device that is within a communication range of the vehicle. The VLC-enabled device can be internal to or external to the vehicle. In one embodiment, a VLC signal is communicated between the vehicle and another vehicle having an on-board VLC gateway and transceiver. The on-board gateway and VLC transceiver enable provide traffic management. A traffic management signal is transmitted from a signal origination device and received at the vehicle using visible light communication, allowing the vehicle to be driven according to the traffic management signal.

27 Claims, 12 Drawing Sheets

AUTOMOTIVE LIGHT BASED COMMUNICATION SYSTEM FOR USER EQUIPMENT

INTRODUCTION

The subject disclosure relates to communication systems in vehicles and in particular to a vehicle communication system that communicates using visible light communication signals.

BACKGROUND

New vehicles and automobiles provide the capability for various communication and entertainment devices to be used along with the vehicles. For example, a mobile phone can be linked to the vehicle to allow a driver to send and receive phone calls in a hands-free manner. Additionally, integrated entertainment systems allow a passenger to view a movie or video, listen to music, etc., during a trip. These communication and entertainment devices generally employ short-range communication technologies in an RF frequency band or communication over wires plugged into the vehicle.

Visible light communication (VLC) provides the ability for machine to machine communication using light, or in other words, binary signals transmitted over a frequency of light. Such communications promises an increase in data transfer rates over conventional radio frequency wireless communication devices with faster data transfer rates expected in the future. As a result various mobile device manufacturers are considering including VLC modules in mobile devices, such as smartphones, tablets, laptop computers, etc., in order to allow these mobile devices to communicate using visible light communication signals. Accordingly, it is desirable to provide a vehicle communication system that allows such VLC-enabled devices to communicate with the vehicle.

SUMMARY

In one exemplary embodiment, a method of communication is disclosed. The method includes providing a first vehicle with an on-board gateway that communicates data using visible light communication (VLC); coupling a VLC transceiver to the on-board gateway for operation by the on-board gateway; providing a VLC-enabled device within a communication range of the VLC transceiver; and communicating data between the VLC-enabled device and the gateway using the VLC transceiver.

In another exemplary embodiment, a vehicle is disclosed. The vehicle includes an on-board gateway for communication using visible light communication (VLC); and a visible light transceiver coupled to the gateway for VLC, wherein the on-board gateway operates the visible light transceiver for data communication.

In yet another exemplary embodiment, a method of communicating between a first vehicle and a second vehicle is disclosed. The method includes transmitting a visible light communication (VLC) signal from an on-board VLC gateway of the first vehicle; and receiving the VLC signal at an on-board VLC gateway of the second vehicle.

In yet another exemplary embodiment, a method of traffic management is disclosed. The method includes transmitting a traffic management signal from a signal origination device, wherein the traffic management signal is a visible light communication signal; receiving the traffic management signal at a vehicle that is communicates using visible light communication; and driving the vehicle according to the traffic management signal.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

The following description is merely exemplary in nature and is not intended to limit the present disclosure, its application or uses.

Figure 1:
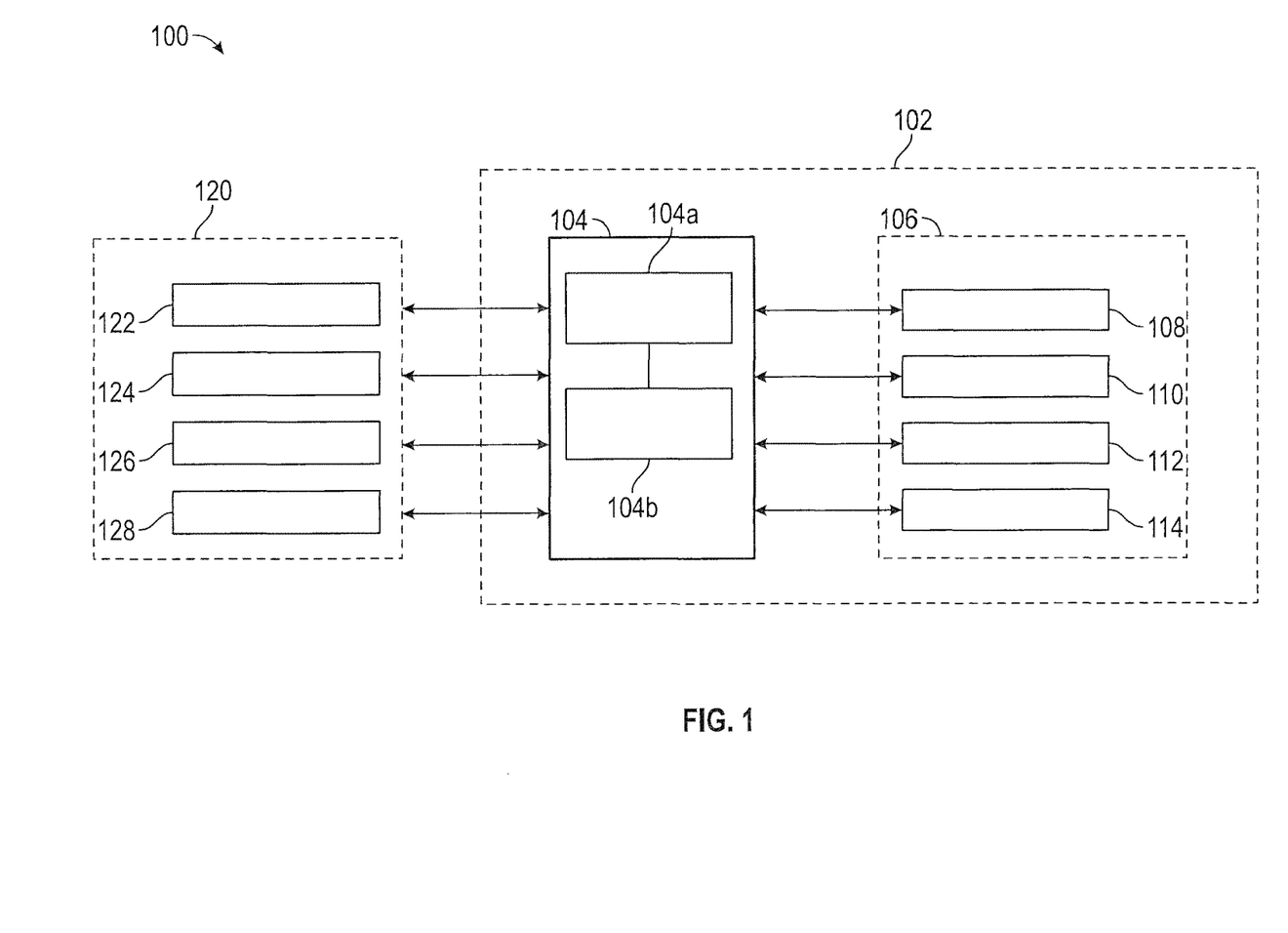
FIG. 1 shows a schematic diagram of a visible light communication (VLC) system of a vehicle that provides visible light communication between various VLC-enabled devices.

FIG. 1 shows a schematic diagram of a visible light communication (VLC) system 100 of a vehicle that provides visible light communication between various VLC-enabled devices. As discussed herein, visible light communication refers to a communication that employs a binary signal carried by electromagnetic radiation in the visible light spectrum. The visible light spectrum may refer to electromagnetic radiation having a wavelength between about 375 nanometers and about 780 nanometers. However, the visible light spectrum can also include infrared radiation wavelengths in various embodiments disclosed herein. A VLC signal is generated by changing the illumination levels of a light source such as a visible light communication transceiver ("VLC transceiver"). In general, changing the illumination levels refers to turning on and off the VLC transceiver in order to represent binary digits. The VLC transceiver generally includes, as a transmitter, a LED or other device that is capable of switching between illumination levels at rates fast enough and with sufficient resolution to provide for high speed data transmission. In other embodiments, the VLC transceiver includes a laser diode as a transmitter. A photodetector can be used as a receiver of the VLC transceiver. In various embodiments of a VLC transceiver, the transmitter or the receiver or both incorporate optic elements as lenses, filters and polarizers in order to better enhance the VLC signal strength over environmental disturbing light sources (e.g. sun, light poles, etc.).

In other various embodiments, the transmitter or receiver or both incorporate multiple LEDs or photodiodes (or transistors) with associated optics. In other embodiments, the VLC transceivers locate the transmitter and receiver in the same box or separate the transmitter and receiver still in the same box by means of internal mechanical fixtures that blocks one from the other, or places the transceiver in one box and the receiver in another box (i.e. distributed transceiver). In another embodiment, the transmitter uses one wavelength and the receiver is tuned to a different wavelength (i.e. wavelength division multiplexed—WDMA). The VLC signal is transmitted from one transceiver and received at another transceiver to complete a visible light communication. VLC protocol can include broadcasting, multicasting, unicasting, beam scanning for peer to peer communication and/or clustering.

VLC system 100 schematically illustrates a first vehicle 102 that includes an on-board VLC communication system 104. The VLC communication system 104 includes a gateway 104a and a VLC transceiver 104b. Gateway 104a controls operation of the VLC transceiver 104b and allows a signal to be communicated using several different communication links and protocols. Thus, the gateway 104a can receive a VLC communication and provide the signal over a cellular communication channel or other RF wireless communication channel (e.g. W-Fi, WiGig and Bluetooth) or another VLC communication channel. In one embodiment, the VLC transceiver 104b communicates with VLC-enabled devices 106 that are within the cabin of the first vehicle 102 using visible light communication. Exemplary VLC-enabled devices 106 include a first mobile device 108 and a second mobile device 110 as well as various integrated devices 112 and various sensors 114 of the first vehicle 102, for example. The first mobile device 108 and/or the second mobile device 110 can be a computer laptop, a tablet device, a smartphone, or other device capable of being carried into and out of a cabin of the first vehicle 102 by a passenger or occupant. Exemplary integrated devices 112 may include an on-board entertainment system, a dashboard display, instrument panel, etc. The various sensors 114 may include range detection sensors, LIDAR, etc., that collect data with respect to the first vehicle 102. While the VLC communication system 104 is described as communicating with the various VLC-enabled devices 106 via VLC communication, it is possible in other embodiments that the VLC communication system 104 communicates with some of these devices using other communication methods, (e.g., wired communication) or communication protocols (e.g., Bluetooth) in addition to visual light communication.

Figure 2:
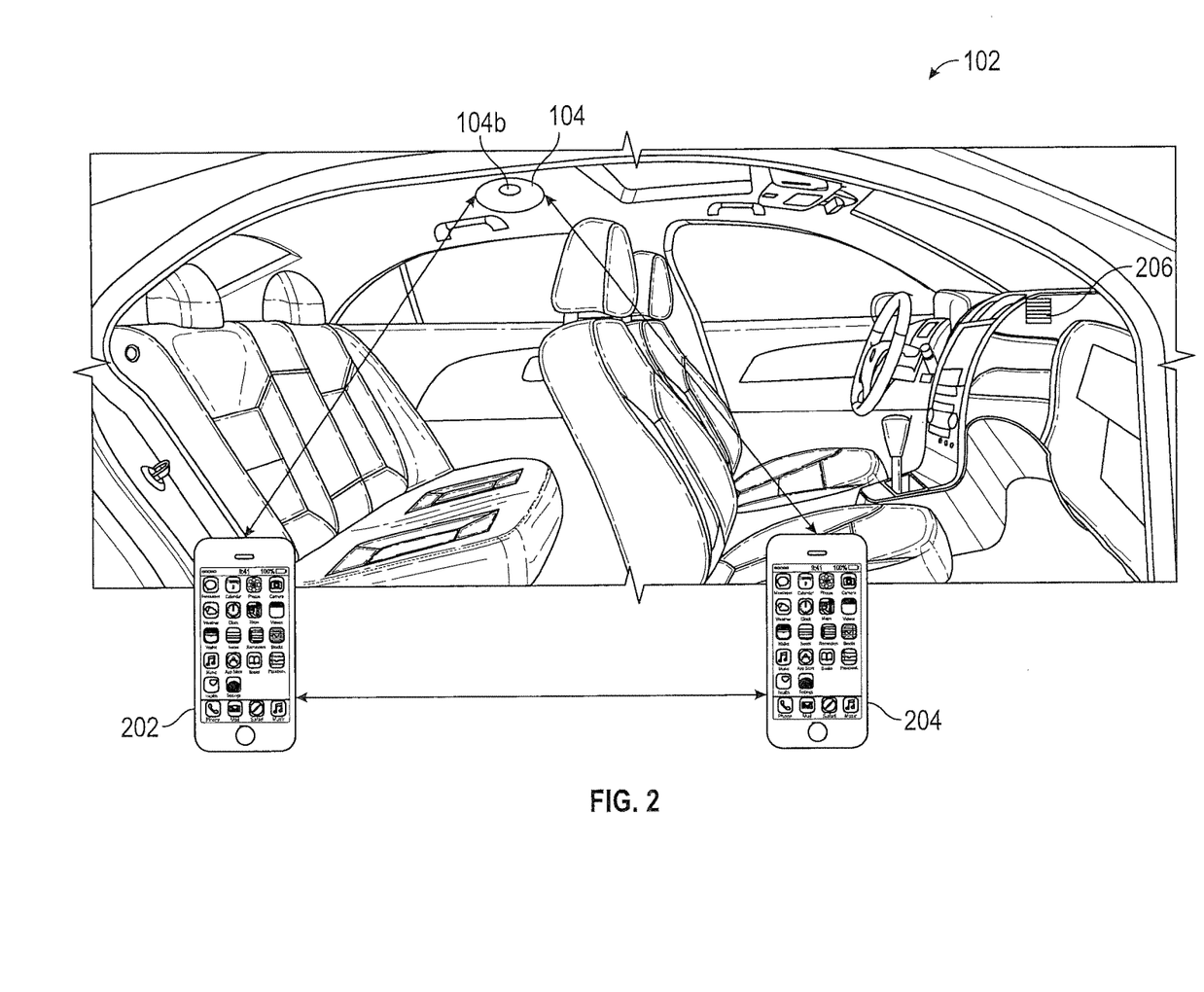
FIG. 2 illustrates use of a VLC communication system for enabling communication between VLC-enabled devices within the cabin of the first vehicle.

FIG. 2 illustrates use of a VLC communication system 104 for enabling communication between VLC-enabled devices within the cabin of the first vehicle 102. The VLC transceiver 104b of the VLC communication system 104 is mounted at an interior surface such as the headliner of the first vehicle 102. By placing the VLC transceiver 104b on the headliner of the first vehicle 102, light from the VLC transceiver 104b illuminates a large volume of the interior of the first vehicle 102, thereby providing VLC communication substantially throughout the cabin. The VLC transceiver 104b can be placed at alternate locations of the vehicle 102 when considered suitable. Additionally, the VLC communication system 104 may employ additional VLC transceivers at separate locations of the cabin in order to provide VLC communication at locations in the cabin out of a line-of-sight of the VLC transceiver 104b. For example, an additional gateway transceiver may be located in a door of the vehicle, in the dashboard, etc.

FIG. 2 illustrates a device-to-device communication within the first vehicle 102 that is enabled by the VLC communication system 104. A first mobile device 202 is located at a first location (e.g., a back seat) in the cabin of the first vehicle 102 and a second mobile device 204 is located at a second location (e.g., a front seat) in the cabin of the first vehicle 102. At their respective locations, the first mobile device 202 and the second mobile device 204 are not in a line-of-sight of each other and therefore are not able to communicate directly with each other using VLC. In order for the first mobile device 202 to communicate with the second mobile device 204, the first mobile device 202 sends a VLC signal to the VLC communication system 104 and the VLC communication system 104 relays the VLC signal to the second mobile device 204. In alternative embodiments, the VLC communication system 104 may communicate with one of the first mobile device 202 and the second mobile device 204 using another communication path or protocol. Using the VLC communication system 104, vehicle occupants can use the first mobile device 202 and the second mobile device 204 to share text, audio, video, etc., play games with each other, and so forth.

The VLC communication system 104 can be in communication with an on-board memory storage device 206 of the first vehicle 102. Thus, media or other data can be uploaded from one or more of the first mobile device 202 and the second mobile device 204 to the on-board memory storage device 206. Data and media can also be downloaded from the on-board memory storage device 206 to one or more of the first mobile device 202 and the second mobile device 204.

Figure 3:
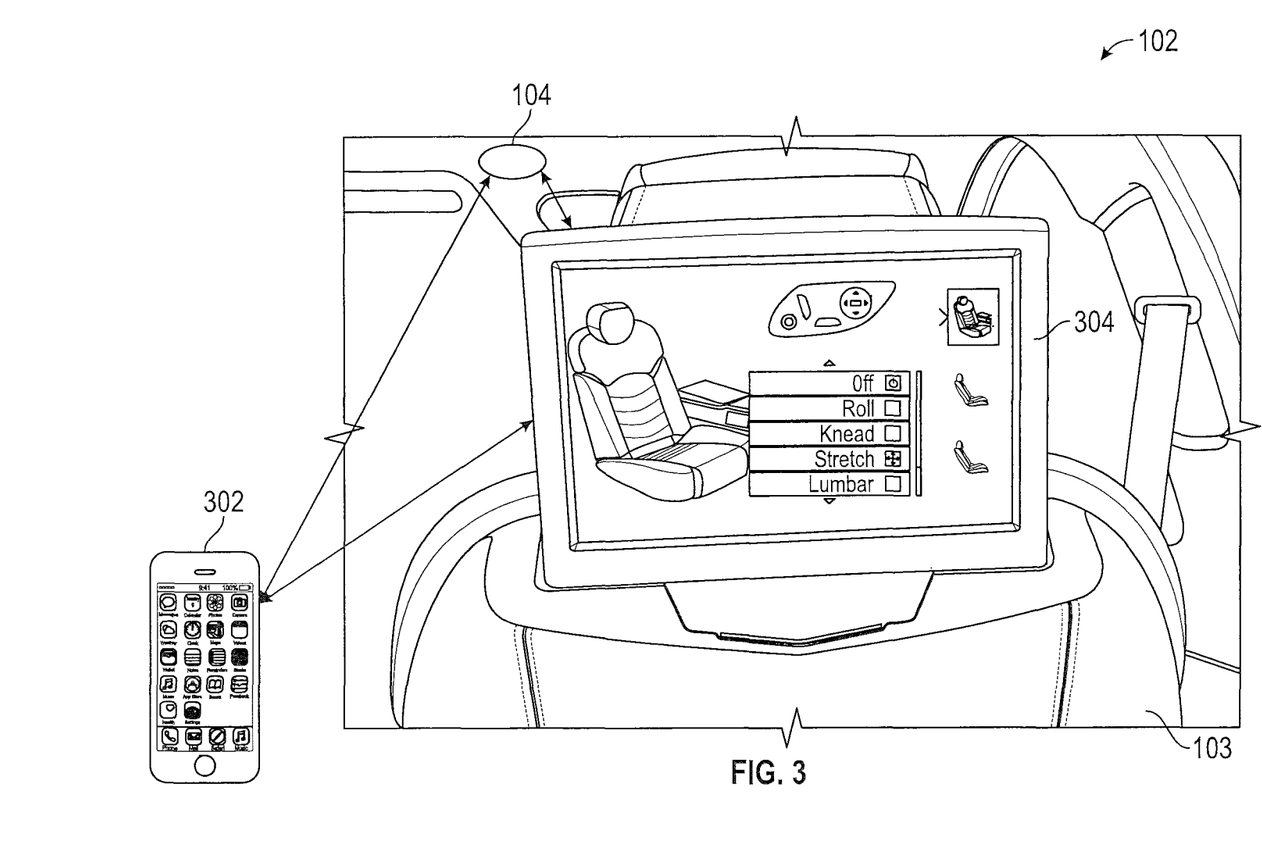
FIG. 3 illustrates data sharing between a mobile device and an integrated display of the first vehicle using the VLC communication system.

FIG. 3 illustrates data sharing between a mobile device 302 and an integrated display 304 of the first vehicle 102 using the VLC communication system 104. In the illustrative embodiment, the integrated display 304 is mounted on a back of a seat 103 of the first vehicle 102. The integrated display 304 may be a display for an entertainment system, an information system or other device. Mobile device 302 communicates with the VLC communication system 104 using VLC signals and the VLC communication system 104 communicates with the integrated display 304 using VLC signals. Thus, information can be shared back and forth (e.g. for the case of gaming where the rear seat view has a touch panel capabilities or audio-video conferencing) between the mobile device 302 and the integrated display 304 via the VLC communication system 104.

Figure 4:
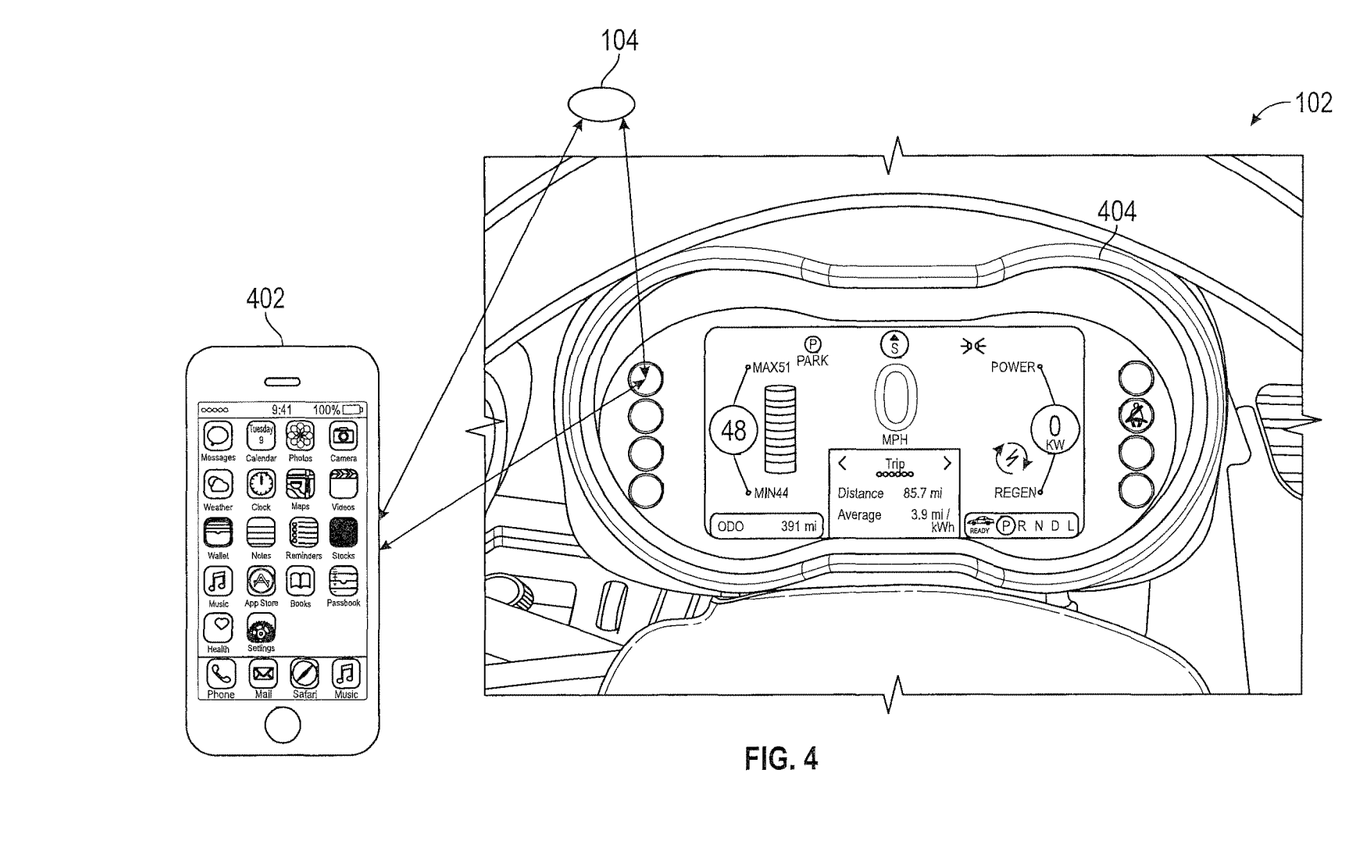
FIG. 4 illustrates data sharing between a mobile device and an instrument panel of the first vehicle using the VLC communication system.

FIG. 4 illustrates data sharing between a mobile device 402 and an instrument panel 404 of the first vehicle 102 using the VLC communication system 104. Mobile device 402 and VLC communication system 104 send VLC signals back and forth, and VLC communication system 104 and instrument panel 404 send VLC signals back and forth. Thus, information can be exchanged between the instrument panel 404 and the mobile device 402 via the VLC communication system 104. The instrument panel 404 includes information such as mileage, current fuel tank status (i.e., fuel gauge), engine temperature, etc. Such vehicle information from the instrument panel 404 can be sent to the mobile device 402 and the mobile device 402 can find additional information based on the vehicle information. For example, the fuel gauge can indicate that the first vehicle 102 will be out of fuel in 30 miles. The mobile device 402 can receive this information and then can perform a search to find a fuel station within 30 miles, including fuel prices, etc. Additionally, data from the mobile device 402 (e.g., last call, messaging data) can be displayed at the instrumental panel 404.

Figure 5:
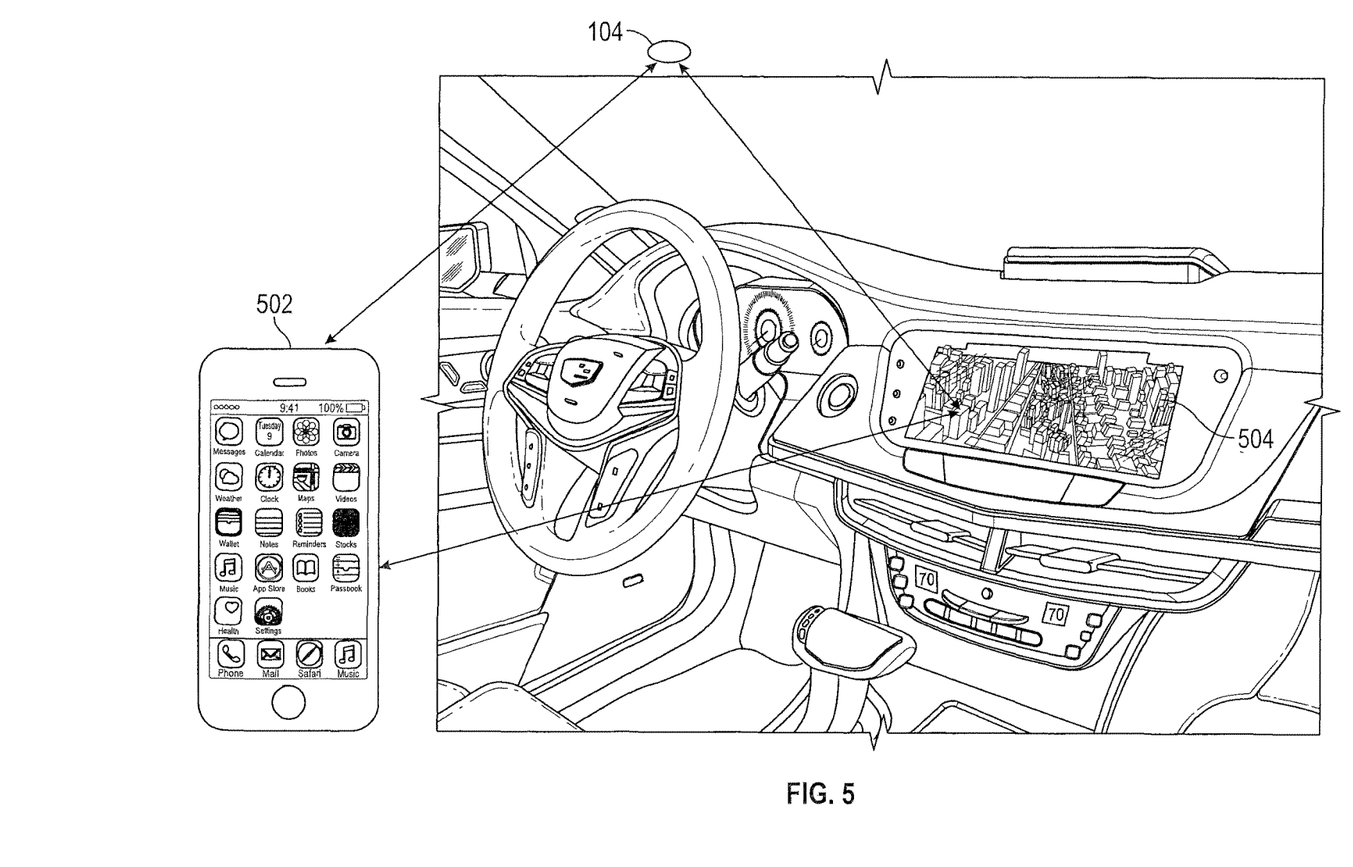
FIG. 5 illustrates data sharing between a mobile device and a central memory storage device of the vehicle using the VLC communication system.

FIG. 5 illustrates data sharing between a mobile device 502 and a central memory storage device 504 and central stack module (CSM) for displaying the information 504 stored at the vehicle 102 using the VLC communication system 104. Such data sharing can include media sharing, data uploading/downloading, gaming, processing and offloading of data, call/message information of the mobile device 502, map information with real-time traffic notifications, etc.

Figure 6:
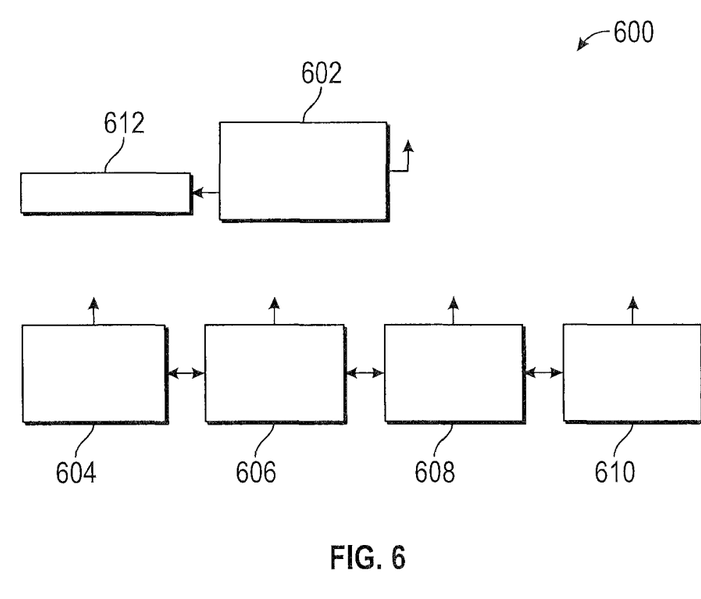
FIG. 6 shows a schematic diagram of VLC communication between a vehicle and various mobile devices in a cabin of the vehicle.

FIG. 6 shows a schematic diagram 600 of VLC communication between a vehicle and various mobile devices in a cabin of the vehicle. The VLC gateway 602 of the vehicle communicates with the various mobile devices (e.g., laptop 604, tablet 606, smartphone 608, video monitor 610) via VLC signals, thereby allowing each of these various devices to be in communication with each other using VLC. The VLC gateway 602 is further in communication with a memory storage device 612, thereby allowing data transfer between the various devices and the memory storage device 612 as well as data storage at the memory storage device 612.

Returning to FIG. 1, the on-board VLC transceiver 104b is capable of VLC communication with devices 120 outside of the first vehicle 102. Exemplary exterior devices 120 include, but are not limited to, a second vehicle 122 that is VLC-enabled, a mobile device 124 carried by a pedestrian, a VLC-enabled light post 126, and a remote VLC station 128. The second vehicle 122 can be similar to the first vehicle in that it includes its own on-board VLC transceiver and various integrated displays and/or sensors. In one embodiment, the on-board VLC communications system 104 of the first vehicle 102 can communicate both with devices 106 within its cabin (i.e., first mobile device 108) and with one or more devices 120 exterior to the first vehicle 102, thereby providing VLC communication between interior devices 106 and exterior devices 120. Such communication between interior devices 106 and exterior devices 120 may employ one VLC transceiver (i.e., VLC transceiver 104b) for interior cabin communication and another VLC transceiver (not shown) for outside communications. These transceivers can communicate with each other via the gateway 104a. In further embodiments, an internal device in the first vehicle 102 can communicate with an internal device in the second vehicle 122 by employing a multi-hop communication through the VLC gateways of intervening vehicles. This communication is further discussed herein with respect to FIGS. 9 and 11, for example.

Figure 7:
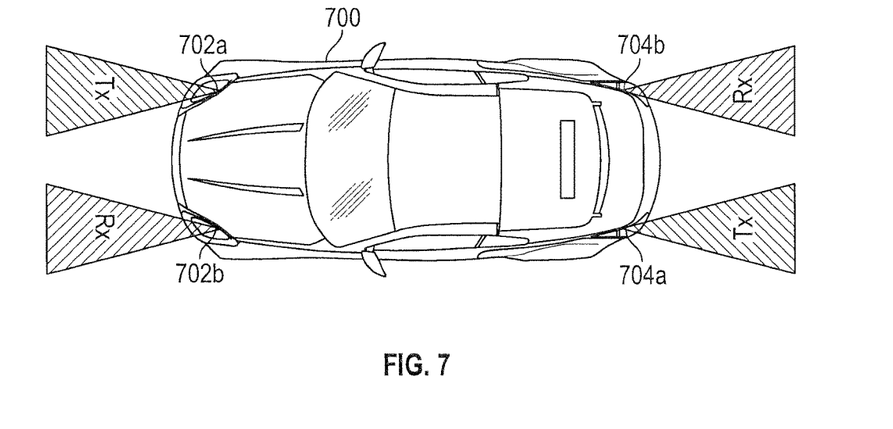
FIGS. 7 and 8 illustrate various configurations of VLC transceivers which enable external vehicle communication.
Figure 8:
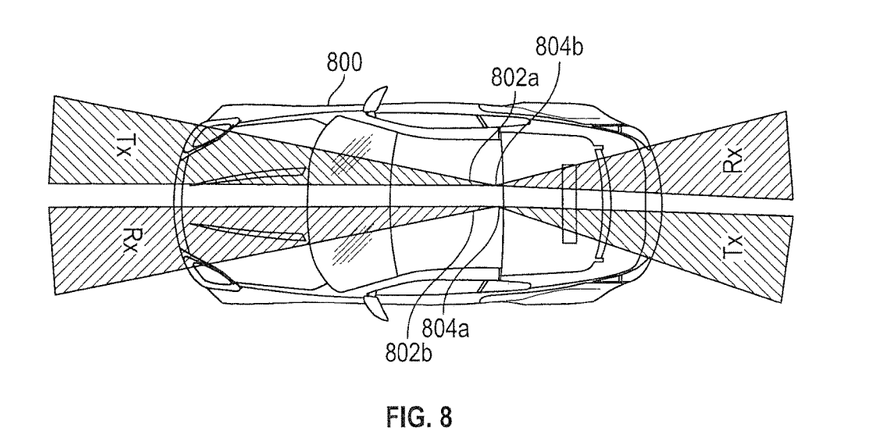

FIGS. 7 and 8 illustrate various configurations of VLC transceivers which enable external vehicle communication. In FIG. 7, vehicle 700 shows a distributed system of transceivers. Transmitter Tx (located at headlight 702a) and receiver Rx (located at headlight 702b) work as a pair to provide a forward-directed VLC transceiver for VLC signal communication at a front end of the vehicle 700. Transmitter Tx (located at taillight 704a) and receiver Rx (located in taillight 704b) work as a pair to provide a backward-directed VLC transceiver for VLC signals communication at a rear end of the vehicle 700.

In FIG. 8, vehicle 800 shows a collocated system of transceivers. Forward transmitter Tx (802a) and forward receiver Rx (802b) work as a pair to provide a forward-directed transceiver for VLC signal communication at a front end of vehicle 800. Backward transmitter Tx (804a) and backward receiver Rx (804b) work as a pair to provide a backward-directed transceiver for VLC signal communication at a rear end of the vehicle 800.

Figure 9:
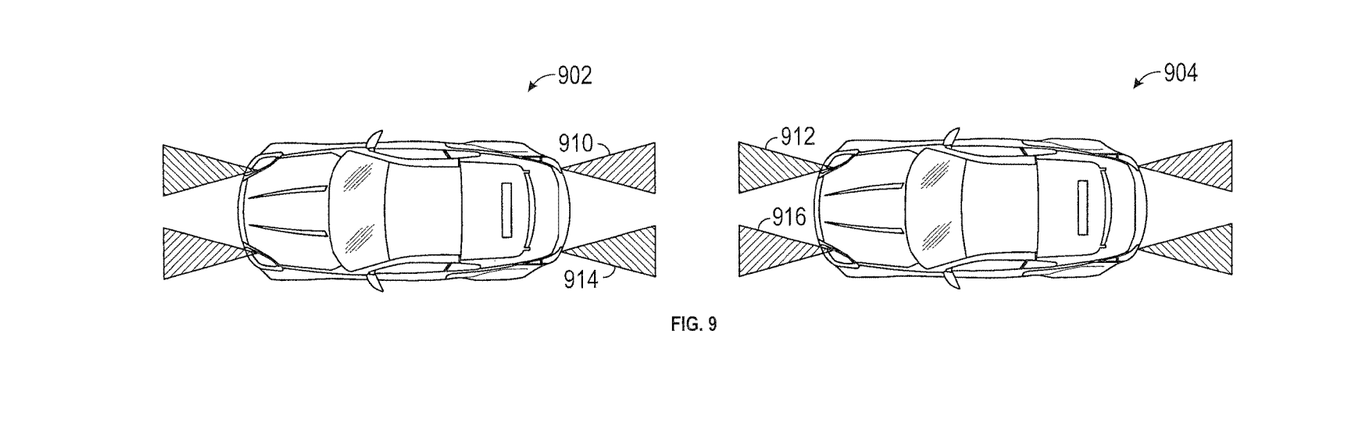
FIG. 9 illustrates a traffic configuration allowing visual light communication between vehicles such as those vehicles shown in FIGS. 7 and 8.

FIG. 9 illustrates a traffic configuration allowing visual light communication between vehicles such as those vehicles shown in FIGS. 7 and 8. First vehicle 902 and second vehicle 904 are driving with the second vehicle 904 behind the first vehicle 902. This is a normal driving configuration found in most traffic patterns. The transmitters and receivers of the first vehicle 902 and second vehicle 904 are arranged so that the first vehicle 902 and second vehicle 904 can communicate with each other. In particular backward-directed transmitter (Tx-back) 910 of the first vehicle 902 is on the same side (i.e., passenger's side) as the forward-directed receiver (Rx-front) 912 of the second vehicle 904. Additionally, backward-directed receiver (Rx-back) 914 of the first vehicle 902 is on the same side (i.e., driver's side) as the forward-directed transmitter (Tx-front) 916 of the second vehicle 904. Thus, a forward communication channel is established along the driver's side of the first vehicle 902 and second vehicle 904 and a backward communication channel is established along the passenger's side of the first vehicle 902 and second vehicle 904. In other embodiments, the transmitters (Tx-back and Tx-front) and receivers (Rx-back and Rx-front) may be in any configuration suitable for WLC signal communication.

Thus, a two-way VLC communication channel exists that allows the first vehicle 902 and the second vehicle 904 to communicate with each other. This communication channel can enable an occupant of the first vehicle 902 to send signals from a mobile device in the first vehicle 902 back and forth with a mobile device being used by an occupant of the second vehicle 904, thereby allowing the two occupants to play games, share videos, audio, text, pictures, etc.

In addition, the first vehicle 902 is capable of relaying information from the second vehicle 904 in a forward direction, and the second vehicle 904 is capable of relaying information from the first vehicle 902 in a backward direction. For a plurality of vehicles aligned in a single line as shown by the first vehicle 902 and second vehicle 904, each vehicle in the line can relay VLC signals back and forth. Therefore a VLC signal at a back of such a line of such vehicles can be relayed to a vehicle at a front of the line, and vice versa. Additionally, a VLC signal originating at a vehicle at any position in the line can be relayed to another vehicle at any other position in the line.

Figure 10:
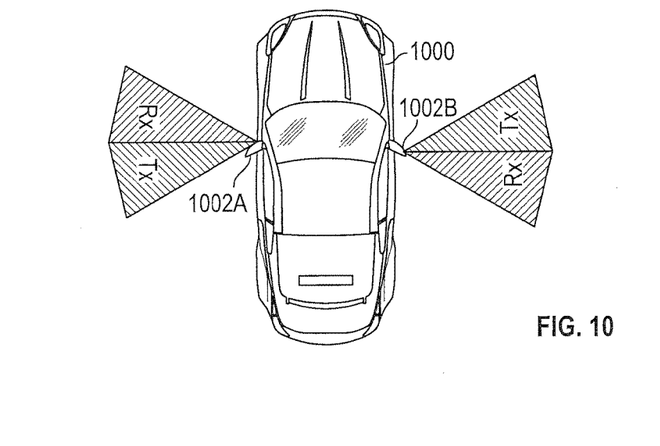
FIG. 10 shows a vehicle having a system of side VLC transceivers.

FIG. 10 shows a vehicle 1000 having a system of side VLC transceivers. VLC transceiver 1002a is located on a driver side of the vehicle 1000. VLC transceiver 1002b is located on a passenger side of the vehicle 1000. In various embodiments, VLC transceivers 1002a and 1002b are located on the side view mirrors of the vehicle 1000. The VLC transceivers 1002a and 1002b can provide communication between the vehicle and a VLC-enabled device located to a side of the vehicle 1000. For example, vehicle 1000 can communicate with a vehicle that is on its driver's side using VLC transceiver 1002a. The VLC transceivers 1002a and 1002b can also be used for range detection of vehicles in order to avoid collision (e.g. using Time-of-Flight measurements). The VLC transceivers 1002a and 1002b can be in communication with other VLC transceivers of the vehicle 1000, such as external VLC transceivers of FIG. 7 and FIG. 8 and/or with VLC transceivers that provide communication inside the vehicle 1000, generally via a the VLC gateway of the vehicle (for example VLC gateway 104a of FIG. 1).

While the vehicles of FIGS. 7-10 are discussed as being able to communicate with each other using visual light communication signals, the present disclosure also enables the vehicles to communicate with a VLC-enabled mobile device carried by a pedestrian, a VLC-enabled structure along the side of the street, a VLC-enabled infrastructure device, etc.

Figure 11:
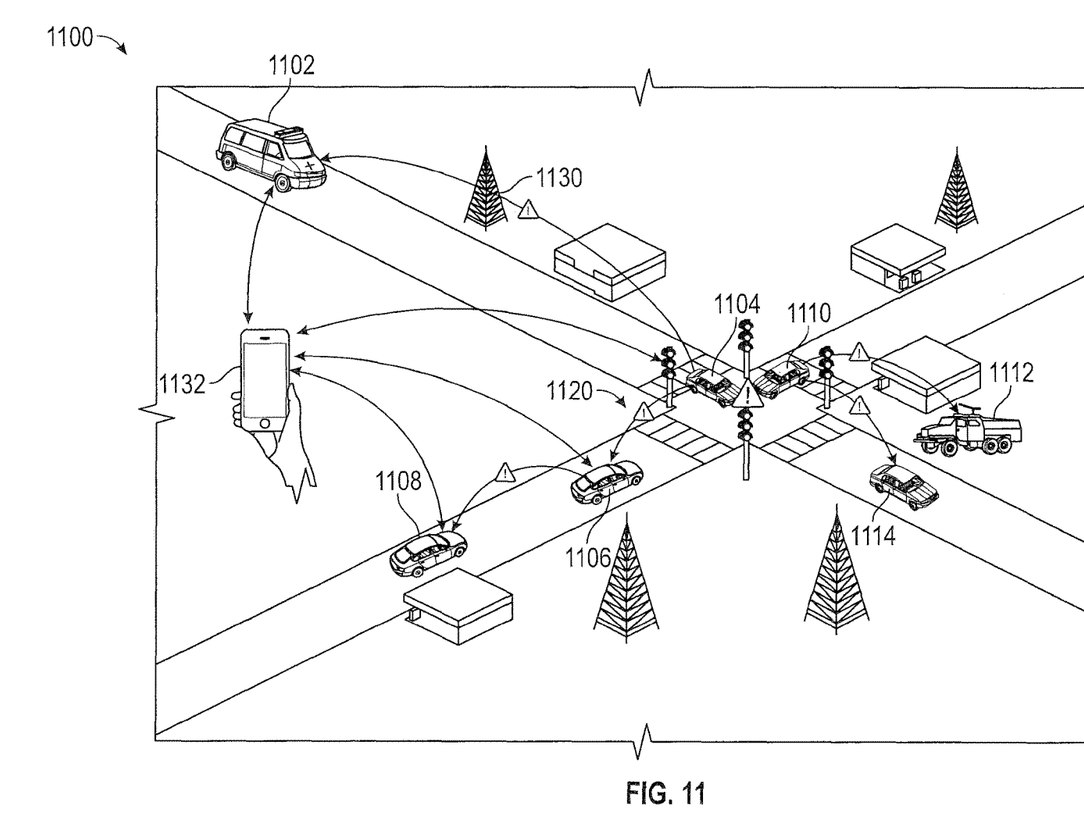
FIG. 11 illustrates a multi-hop visible light communication system that provides communication between a first vehicle and a second vehicle using multiple vehicles as relay points.

FIG. 11 illustrates a multi-hop visible light communication system 1100 that provides communication between a first vehicle and a second vehicle using multiple vehicles as relay points. Each vehicle (1102, 1104, 1106, 1108, 1110, 1112 and 1114) is configured for visible light communication with at least one other vehicle, as described herein. To send a VLC signal from vehicle 1102 to vehicle 1108, for example, vehicle 1102 sends the VLC signal to vehicle 1104, which relays the VLC signal to vehicle 1106, which relays the VLC signal to vehicle 1108.

In one embodiment, the signal sent by vehicle 1102 is a traffic management signal that can be implemented at the vehicles that receive the traffic management signal, including vehicles 1104, 1106, 1108, 1110, 1112, 1114. In particular, vehicle 1102 can be an emergency vehicle, such as an ambulance, fire truck, police vehicle, etc. A signal origination device that is conveyed by the vehicle 1102 can originate the traffic management signal. Vehicle 1102 then transmits the traffic management signal to a nearby vehicle (e.g., vehicle 1104). The traffic management signal instructs vehicles to be aware of the approach of vehicle 1102, especially at intersection 1120. While vehicle 1104 will most likely be out of the intersection 1120 by the time vehicle 1102 approaches the intersection 1120, vehicle 1104 nonetheless relays the traffic management signal to vehicles 1106 and 1110. Vehicle 1106 relays the signal to vehicle 1108. Vehicle 1108 is currently at a distance from the intersection 1120 such that it would be in the intersection 1120 when the emergency vehicle 1102 arrives at the intersection 1120, assuming no knowledge of the emergency vehicle 1102. However, upon receiving the traffic management signal, the driver of vehicle 1108 can take the appropriate action to allow the emergency vehicle 1102 to pass through the intersection 1120 unimpeded. Meanwhile, vehicle 1110 can relay the traffic management signal to vehicle 1114 and additional emergency vehicle 1112. Vehicle 1114, if necessary, can pull over to the side of the road in plenty of time to clear a path for emergency vehicle 1102. Additionally, emergency vehicles 1102 and 1112 can communicate via visible light communication using vehicles 1104 and 1110 as relay vehicles. Therefore, the VLC system 1100 provides (an ad-hoc) traffic management to facilitate a traffic flow for an emergency vehicle and also provides street-level communications between emergency vehicles. While the signal origination device is described as being conveyed by the emergency vehicle 1102, in other embodiments a signal origination device may be disposed at a suitable location such as from communication tower 1130, etc. Additionally, the traffic management signal can be relayed to a VLC-enabled mobile device 1132 in order to alert pedestrians, for example, using any vehicle (e.g., vehicles 1102, 1104, 1106, 1108) in VLC communication with the mobile device 1132.

Figure 12:
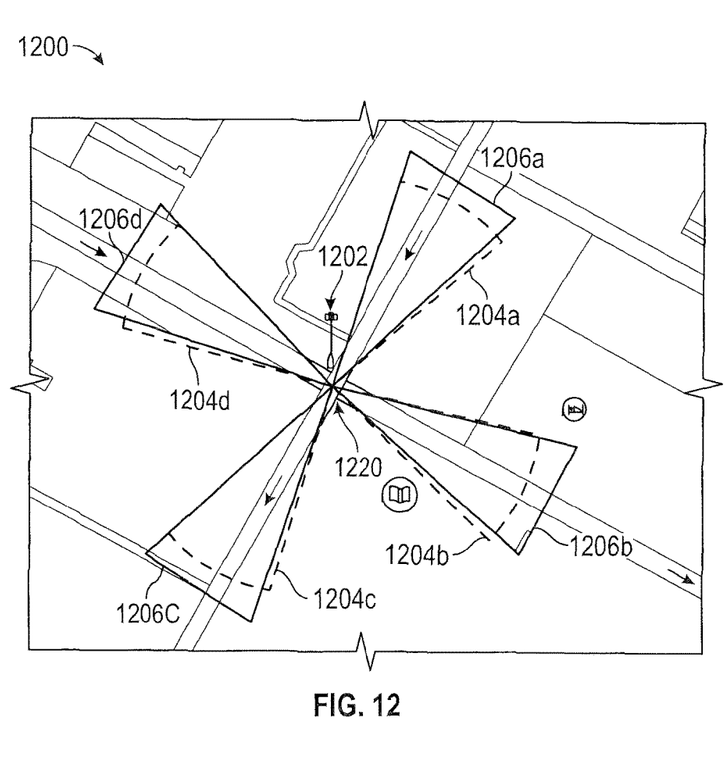
FIG. 12 discloses a VLC system including a VLC-enabled station or tower for improving a traffic flow and/or traffic safety.

FIG. 12 discloses a VLC system 1200 including a VLC-enabled station or tower for improving a traffic flow and/or traffic safety. VLC-enabled station 1202 includes cameras capable of providing a view along four different camera directions (1204a, 1204b, 1204c and 1204d) and VLC transceivers for transmitting VLC signals in four different VLC transmission directions (1206a, 1206b, 1206c and 1206d). As shown in FIG. 12, the camera directions and the VLC transmission directions are along streets approaching the intersection 1220. The VLC-enabled station 1202 can be a dedicated station or tower that is placed at the intersection 1220. Alternatively, the VLC-enabled station 1202 can be a device that is retrofitted into an existing structure, such as a traffic light, light pole or other existing infrastructure. The retrofitted device can include the one or more remote cameras, the VLC transceivers and a processor for operating the cameras and transceivers. The station 1202 can additionally be in communication with a back office which may be a municipal office, for example, that provides information such as traffic information which can be transmitted from the station 1202 to a vehicle for the benefit of the driver of the vehicle. The station 1202 can be a signal origination device providing traffic data to a vehicle.

Figure 13:
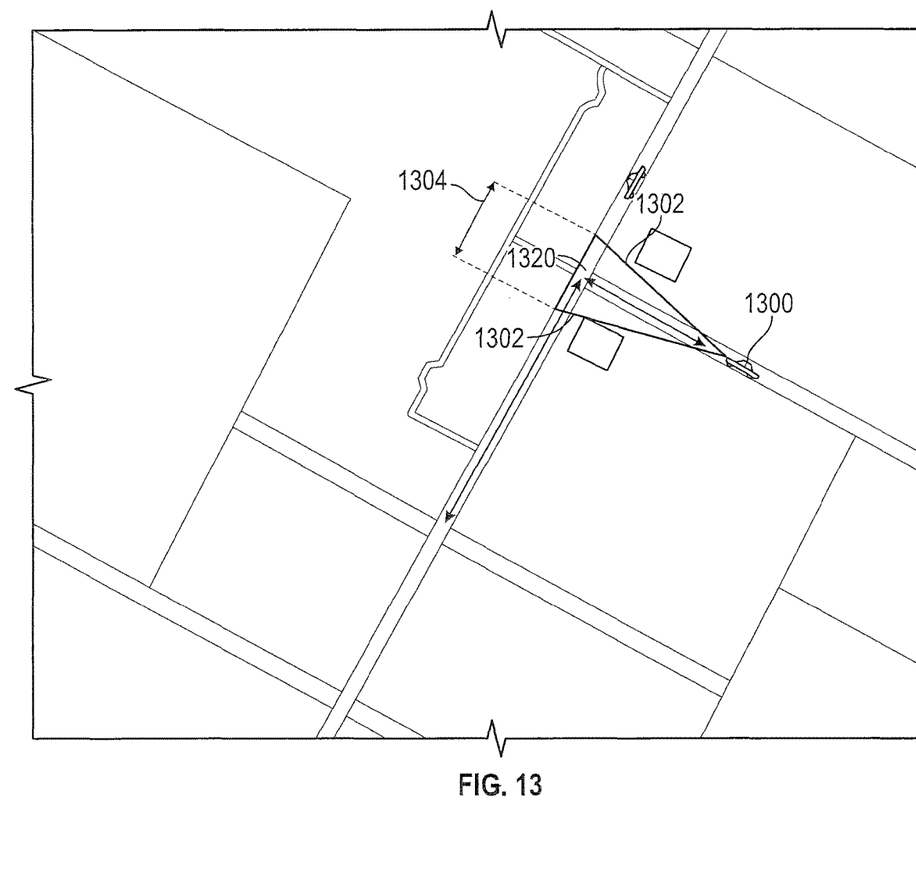
FIG. 13 illustrates a traffic problem that can be resolved using a VLC-enabled station of FIG. 12.

FIG. 13 illustrates a traffic problem that can be resolved using a VLC-enabled station 1202 of FIG. 12. Vehicle 1300 is approaching an intersection 1320 which is surrounded by buildings 1302 or other visual impediments on both sides of the street. From the present position of the vehicle 1300, the driver has a visual range of about 100 feet (about 30 meters) from side to side and is relatively unaware of cross-traffic.

Figure 14:
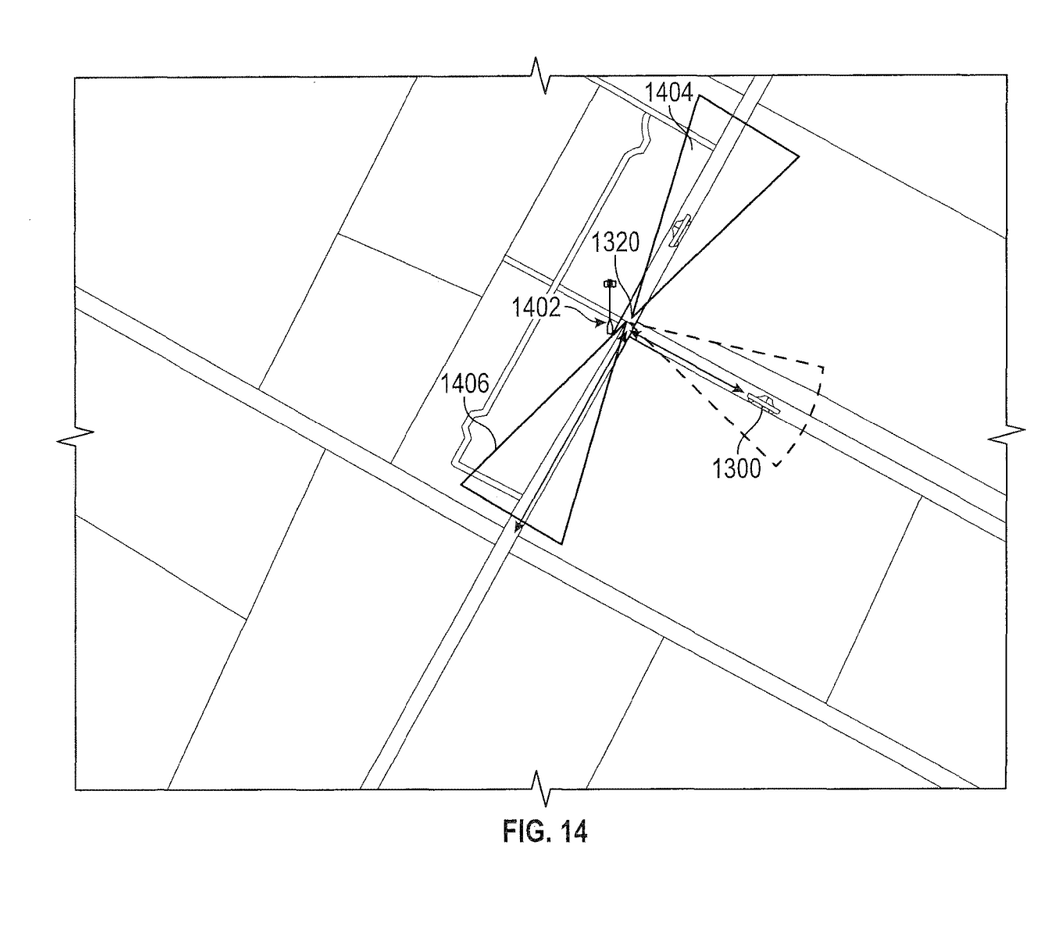
FIG. 14 illustrates use of a VLC-enabled station to provide useful traffic information for the vehicle approaching intersection.

FIG. 14 illustrates use of a VLC-enabled station 1402 to provide useful traffic information for the vehicle 1300 approaching intersection 1320. VLC-enabled station 1402 includes a remote camera that provides a visual image along cross-traffic street directions 1404 and 1406. The remote camera is coupled to a VLC transceiver, which transmits the visual image to vehicle 1300 using a VLC signal. The vehicle 1300 can display the images of the cross-traffic at its dashboard display to provide the driver knowledge of oncoming cross-traffic, thereby increasing the safety of the intersection 1320. In another embodiment, the VLC signal can be sent into an ADAS (Advanced Driver Assistance System), to a vehicle onboard sensing system that provides advanced safety features such as anti-collision features or autonomous driving features.

In addition to providing traffic video and/or traffic management signals to the vehicle, a VLC-enabled station can be used to perform other tasks facilitating the driving experience. For example, a VLC-enabled station may be used along a toll road and may communicate with an on-coming vehicle using VLC to perform a monetary transaction for payment of a toll. VLC communication provides security for wireless monetary transactions or other sensitive communications. Such security results from a controlled light signal being spread over a narrow angle. This arrangement results in a nearly point-to-point wireless communication and minimizes the risks of eavesdropping by third parties, in comparison to the security provided by conventional wireless communications systems (e.g. Wi-Fi, Bluetooth).

In another embodiment, the VLC-enabled station may be located at a parking garage where it is linked to various devices of the parking garage that keep track of which parking spaces are available, which are currently being used, how many parking spaces are available, etc. This information can be transmitted to the vehicle to let the driver know if parking is available as well as which parking spaces are available. In addition, a monetary transaction can occur between the vehicle and the VLC-enable station using visual light communication to allow the driver to pay for parking. In another embodiment, a VLC-enabled station can be used at a drive-through of an establishment, allowing the driver to perform a monetary transaction via VLC signals between the vehicle and the establishment.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A method of communication, comprising:
   providing a first vehicle with an on-board gateway that communicates data using visible light communication (VLC);
   coupling a VLC transceiver to the on-board gateway for operation by the on-board gateway;
   providing a VLC-enabled device within a cabin of the first vehicle within a communication range of the VLC transceiver; and
   communicating data via a VLC signal between the VLC-enabled device and the on-board gateway using the VLC transceiver.

2. The method of claim 1, wherein the VLC-enabled device includes a first mobile device.

3. The method of claim 2, further comprising communicating data from the first mobile device to a second VLC-enabled device conveyed by the first vehicle.

4. The method of claim 3, wherein the second VLC-enabled device conveyed by the first vehicle is at least one of: (i) a second mobile device; (ii) an integrated device of the first vehicle; and (iii) an on-board memory storage device of the first vehicle.

5. The method of claim 3, wherein communicating data between the first mobile device and the second VLC-enabled device further comprises communicating between the first mobile device and the on-board gateway and communicating between the on-board gateway and the second VLC-enabled device.

6. The method of claim 1, further comprising communicating between the on-board gateway of the first vehicle and a device outside of the first vehicle using VLC.

7. The method of claim 6, wherein the device outside of the first vehicle is at least one of: (i) a second vehicle; (ii) a VLC-enabled device conveyed by a second vehicle; (ii) a VLC-enabled mobile device; (iii) a VLC-enabled light post; and (iv) a remote VLC-enabled station.

8. The method of claim 1, wherein the on-board gateway is capable of communicating using a communication protocol in addition to VLC.

9. The method of claim 1, wherein the visual light communication of the first vehicle includes a monetary transaction.

10. A vehicle, comprising:
    an on-board gateway for communication using visible light communication (VLC); and
    a visible light transceiver coupled to the gateway for VLC, wherein the on-board gateway operates the visible light transceiver for data communication via a VLC signal between the gateway and a VLC-enabled device conveyed within a cabin of the vehicle.

11. The vehicle of claim 10, wherein the VLC-enabled device conveyed within the cabin of the vehicle is one of: a mobile device; a computer laptop; a tablet device; and a smartphone.

12. The vehicle of claim 10, wherein the visible light transceiver provides VLC communication between the VLC-enabled device within the cabin of the vehicle and a device outside of the vehicle.

13. The vehicle of claim 10, wherein the on-board gateway further communicates with at least one of: (i) an entertainment system of the vehicle; (ii) an instrument panel of the vehicle; (iii) a display of a computer system of the vehicle; (iv) a memory storage device of the vehicle.

14. The vehicle of claim 10, wherein the visible light transceiver is located at one of: (i) an interior of the cabin; (ii) an outer surface of a roof of the vehicle; (iii) a headlight of the vehicle; (iv) a taillight of the vehicle; and (v) a side mirror of the vehicle.

15. A method of communicating between a first vehicle and a second vehicle, comprising:
    transmitting a visible light communication (VLC) signal from a first mobile device conveyed within a cabin of the first vehicle to an on-board VLC gateway of the first vehicle; and
    transmitting the VLC signal from the on-board VLC gateway of the first vehicle to an on-board VLC gateway of the second vehicle; and
    transmitting the VLC signal from the on-board VLC gateway of the second vehicle to a second mobile device conveyed within a cabin of the second vehicle.

16. The method of claim 15, further comprising transmitting the signal via a VLC transceiver located at an outer surface of the first vehicle and receiving the signal via VLC transceiver located at an outer surface of the second vehicle.

17. The method of claim 16, wherein the VLC transceiver of the first vehicle is located at one of: (a) a headlight of the first vehicle; (b) a tail light of the first vehicle; (c) a roof of the first vehicle; (d) a side of the vehicle; and (e) on a side mirror of the vehicle.

18. The method of claim 15, further comprising displaying information carried by the VLC signal at a display at the second vehicle, wherein the display includes at least one of: (i) a mobile device within a cabin of the second vehicle; and (ii) an display integrated into the second vehicle.

19. The method of claim 15, further comprising relaying the VLC signal from the second vehicle to another VLC-enabled device.

20. The method of claim 19 wherein the other VLC-enabled device is one of: (i) a third vehicle; (ii) a stationary device; (iii) a light pole; (iv) a remote station; and (v) a mobile device held by a pedestrian.

21. The method of claim 15, further comprising aligning the first vehicle and the second vehicle to set up a VLC communication link for visual light communication.

22. The method of claim 21, wherein setting up the VLC communication link further comprises aligning a headlight of the first vehicle with a tail light of the second vehicle.

23. The method of claim 22, wherein the signal origination device is included in an emergency vehicle.

24. The method of claim 23, wherein the vehicle further relays the traffic management signal using a second visible light communication signal to a VLC-enabled mobile device.

25. The method of claim 23, wherein the signal origination device transmits a video camera view to the vehicle to enhance a field-of-view of the vehicle.

26. The method of claim 23, wherein the signal origination device is located at one of: (i) an infrastructure unit: (ii) a light post.

27. A method of traffic management, comprising:
receiving, at a first vehicle, a traffic management signal from a signal origination device, wherein the traffic management signal is a visible light communication signal;
transmitting the traffic management signal from the first vehicle to a second vehicle to a side of the first vehicle using visible light communication; and
driving the second vehicle according to the traffic management signal.

* * * * *